United States Patent [19]

Stainton

[11] Patent Number: 5,042,327
[45] Date of Patent: Aug. 27, 1991

[54] METHOD FOR UPSHIFTING A COMPOUND SEMI-BLOCKED SPLITTER TYPE AUTOMATIC MECHANICAL TRANSMISSION

[75] Inventor: John E. Stainton, Chorley, England

[73] Assignee: Eaton Corporation, Cleveland, Ohio

[21] Appl. No.: 465,281

[22] Filed: Jan. 16, 1990

[30] Foreign Application Priority Data

Mar. 28, 1989 [GB] United Kingdom ............... 8906918

[51] Int. Cl.$^5$ ............................................. F16H 3/08
[52] U.S. Cl. ........................................ 74/866; 74/858; 74/336 R
[58] Field of Search .................... 74/858, 336 R, 866

[56] References Cited

U.S. PATENT DOCUMENTS

| Re. 32,591 | 2/1988 | Richards | 74/866 |
|---|---|---|---|
| 4,226,141 | 10/1980 | Espenschied | 74/858 |
| 4,361,060 | 11/1982 | Smyth | 74/866 |
| 4,531,430 | 7/1985 | Holmes | 74/858 |
| 4,591,035 | 5/1986 | Ueda et al. | 192/359 |
| 4,603,596 | 8/1986 | Akashi et al. | 74/336 R |
| 4,648,290 | 3/1987 | Dunkley et al. | 74/866 |
| 4,690,017 | 9/1987 | Taniguchi et al. | 74/866 |
| 4,726,245 | 2/1988 | Klaue | 74/336 R |
| 4,735,109 | 4/1988 | Richards et al. | 74/745 |
| 4,736,643 | 4/1988 | Richards | 74/339 |
| 4,930,078 | 5/1990 | Dunkley et al. | 74/866 X |
| 4,930,374 | 6/1990 | Simonyi et al. | 74/336 R X |

FOREIGN PATENT DOCUMENTS 0269942 6/1988 European Pat. Off. .

Primary Examiner—Leslie A. Braun
Assistant Examiner—Matthew Stavish
Attorney, Agent, or Firm—H. D. Gordon

[57] ABSTRACT

An improved control method and control system for controlling the upshifting of an AMT (10) system including a compound splitter type semi-blocked transmission (12) is provided. In particular, different control logic is utilized to implement simple and compound upshifts of the transmissions.

10 Claims, 6 Drawing Sheets

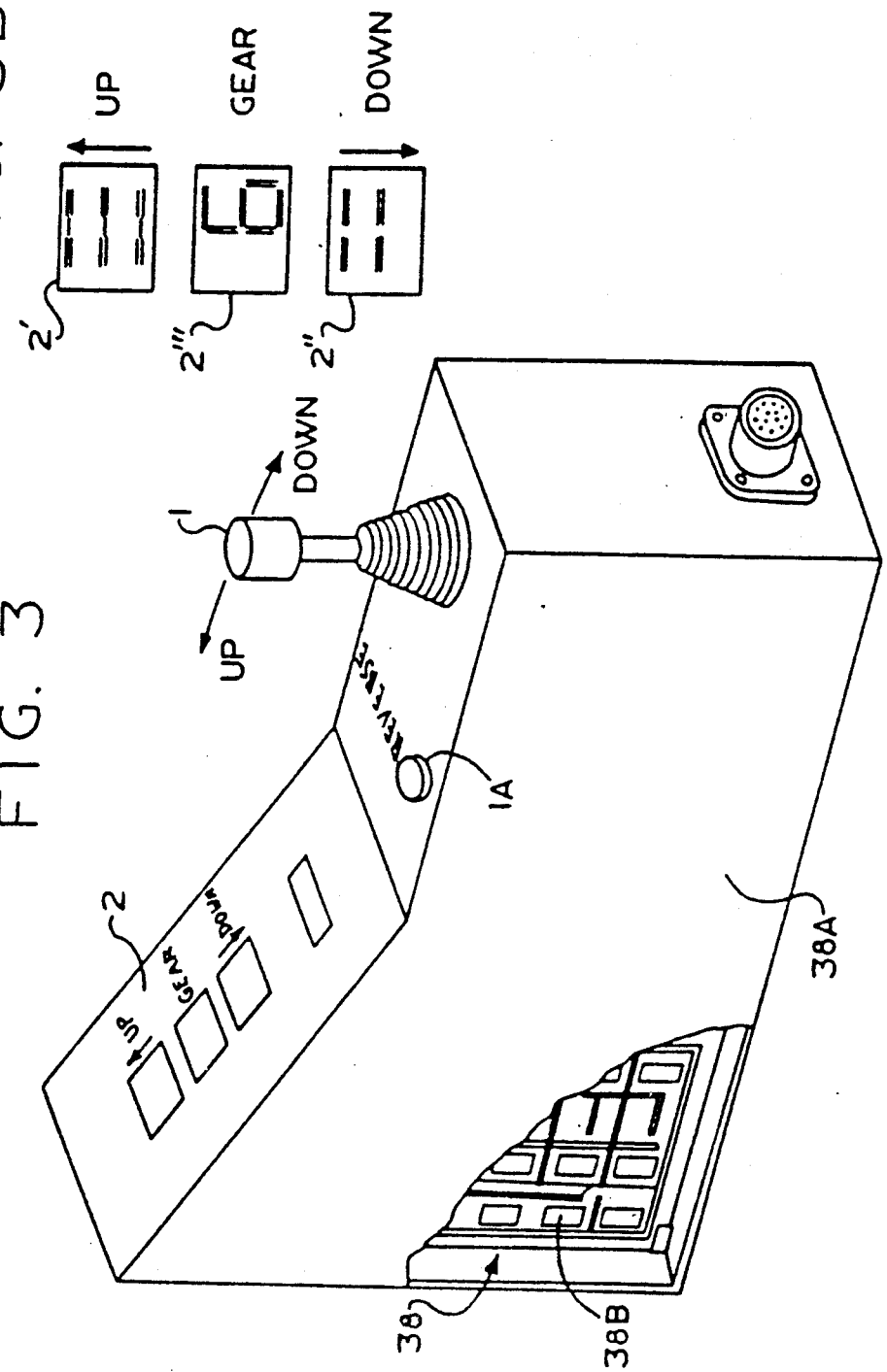

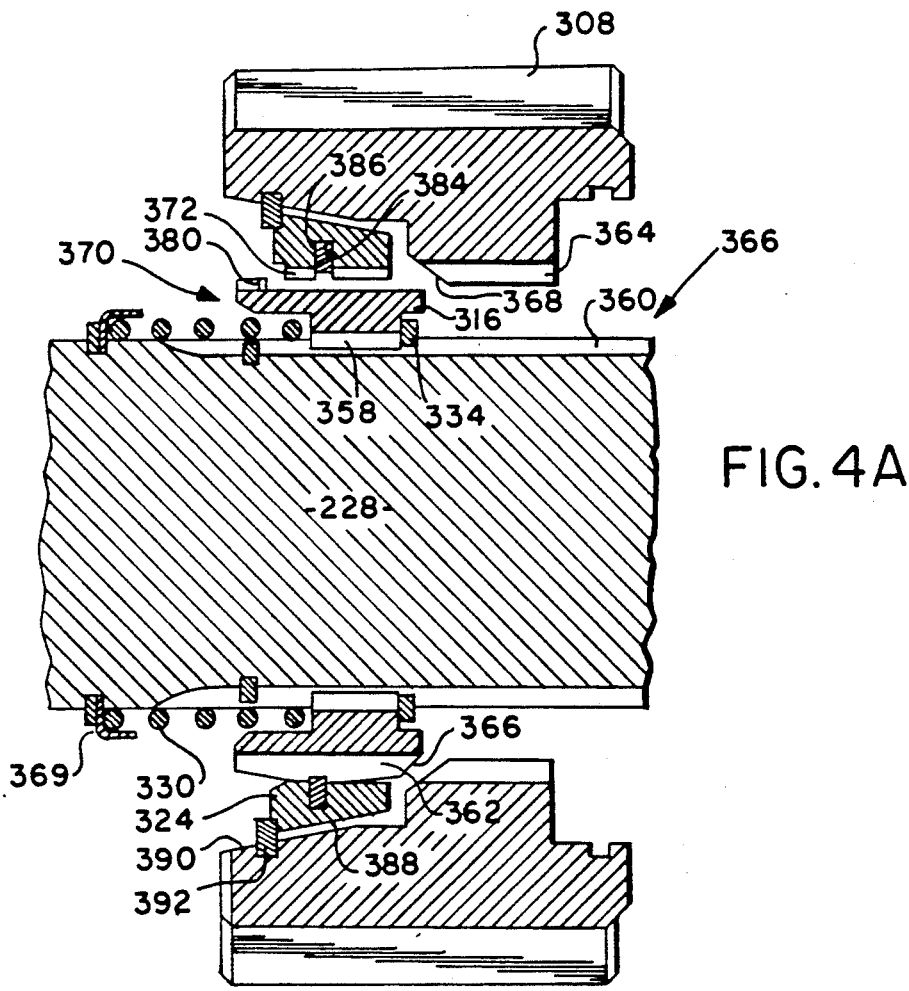
FIG. 4A
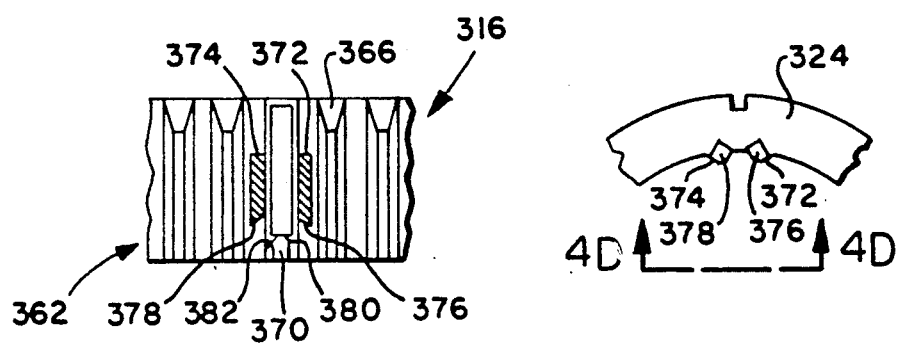
FIG. 4B
FIG. 4C
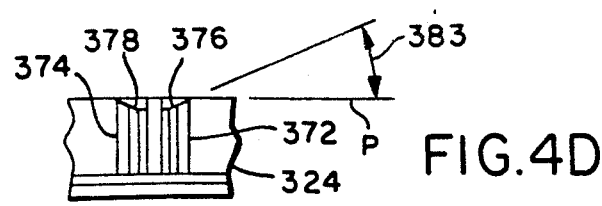
FIG. 4D

METHOD FOR UPSHIFTING A COMPOUND SEMI-BLOCKED SPLITTER TYPE AUTOMATIC MECHANICAL TRANSMISSION

BACKGROUND OF THE INVENTION

1. Field of the Invention

The present invention relates to a control method and control system for upshifting a compound semi-blocked splitter type automatic or semi-automatic transmission system. Automatic and semi-automatic mechanical transmission systems are known in the prior art and illustrated in U.S. Pat. Nos. 4,361,060 and 4,648,290, the disclosures of which are hereby incorporated by reference. Semi-blocked compound transmissions of the splitter type are known in the prior art and illustrated in U.S. Pat. Nos. 3,924,484; 4,735,109 and 4,736,643, the disclosures of which are hereby incorporated by reference.

2. Description of the Prior Art

Fully automatic transmission systems, both for heavy-duty vehicles such as heavy-duty trucks and/or coaches, and for automobiles, that sense throttle openings or positions, vehicle speeds, engine speeds, and the like, and automatically shift the vehicle transmission in accordance therewith are well known in the prior art. Such fully automatic change gear automated mechanical transmissions utilizing electronic and/or pneumatic logic and actuators to engage and disengage mechanical (i.e. positive) clutches to achieve a desired gear ratio. Examples of such transmissions may be seen by reference to U.S. Pat. Nos. 3,961,546; 4,081,065; 4,361,060; 4,569,255; 4,576,065 and 4,576,263, the disclosures of which are hereby incorporated by reference.

Semi-automatic mechanical transmission controls wherein automatic changing between a plurality of gear ratios is provided while normally permitting the driver to choose when to make a particular gear ratio change, whether to select the immediately consecutive ratio up or down or to skip one or more ratios, and when to slip, i.e. to incompletely engage, the vehicle master clutch in a lower crawler gear are known. Furthermore, the semi-automatic control system prohibits engagement of a driver selected higher ratio, i.e. an upshift, that would cause the engine speed to decrease below the idle speed, i.e. would cause stalling and/or over-stressing at low speeds of the engine, and of a lower ratio, i.e. a downshift, if such a change would cause overspeeding of the engine. Examples of such a semi-automatic transmission control can be seen by reference to above-mentioned U.S. Pat. No. 4,648,290.

A control method for shifting automatic and semi-automatic mechanical transmissions (called "AMTs") including semi-blocked, splitter type compound transmissions wherein each shift, both simple (auxiliary section only) shifts and compound (main and auxiliary section) shifts, involves shifting of the main transmission section to neutral to allow shifting of the blocked auxiliary section without requiring a crossing of synchronous of the preselected jaw clutch members is disclosed in U.S. Pat. No. Re. 32,591, the disclosure of which is hereby incorporated by reference.

While shifting of AMTs including semi-blocked transmissions by the method of shifting the main section into neutral and then allowing the preselected blocked jaw clutches of the auxiliary section to unblock, usually under the influence of sensor unblocking ramps as disclosed in above-mentioned U.S. Pat. No. 3,924,484, without requiring/causing the preselected auxiliary section blocked jaw clutch members to "cross" or "pass-through" synchronous is acceptable for most operating conditions, under certain conditions due to frictional drags, actuation delays, cold operating conditions, and/or a requirement for a quicker and more positive shifting of the auxiliary section, the prior art shifting control method was less than totally satisfactory.

SUMMARY OF THE INVENTION

In accordance with the present invention, the drawbacks of the prior art have been minimized or overcome by the provision of an upshift method for a compound splitter type semi-blocked AMT which provides a positive reversal of relative rotation (and thus a crossing of synchronous) of the preselected auxiliary section clutch members. Accordingly, delays and/or failures in auxiliary section unblocking mechanisms due to excessive friction/drag situations are eliminated allowing a quicker more positive shifting in the blocked auxiliary section.

The above is accomplished by disengaging the main section during each upshift, allowing and/or causing the input shaft to decelerate and then beginning main section reengagement at a time which will cause the input shaft to engage and rotate the transmission gearing at a speed very close to the synchronous speed for the input shaft in the newly engaged ratio but sufficient to cause a reversal of relative rotation of the preselected auxiliary section blocked jaw clutch members to assure a crossing of synchronous thereof for assured engagement thereof if the selected auxiliary section ratio is not previously engaged under the effect of the sensor unblocking ramps.

Accordingly, it is an object of the present invention to provide a new and improved control system and control method for upshifting a compound semi-blocked splitter type AMT.

This and other objects and advantageous of the present invention will become apparent from a reading of the detailed description of the preferred embodiment taken in connection with the attached drawings.

DESCRIPTION OF THE DRAWINGS

FIGS. 3 and 3B illustrate the control and display console of the system illustrated in FIG. 1.

FIGS. 4A-4D are partial views of various components of the transmission of FIG. 4.

DESCRIPTION OF THE PREFERRED EMBODIMENT

Figure 1:
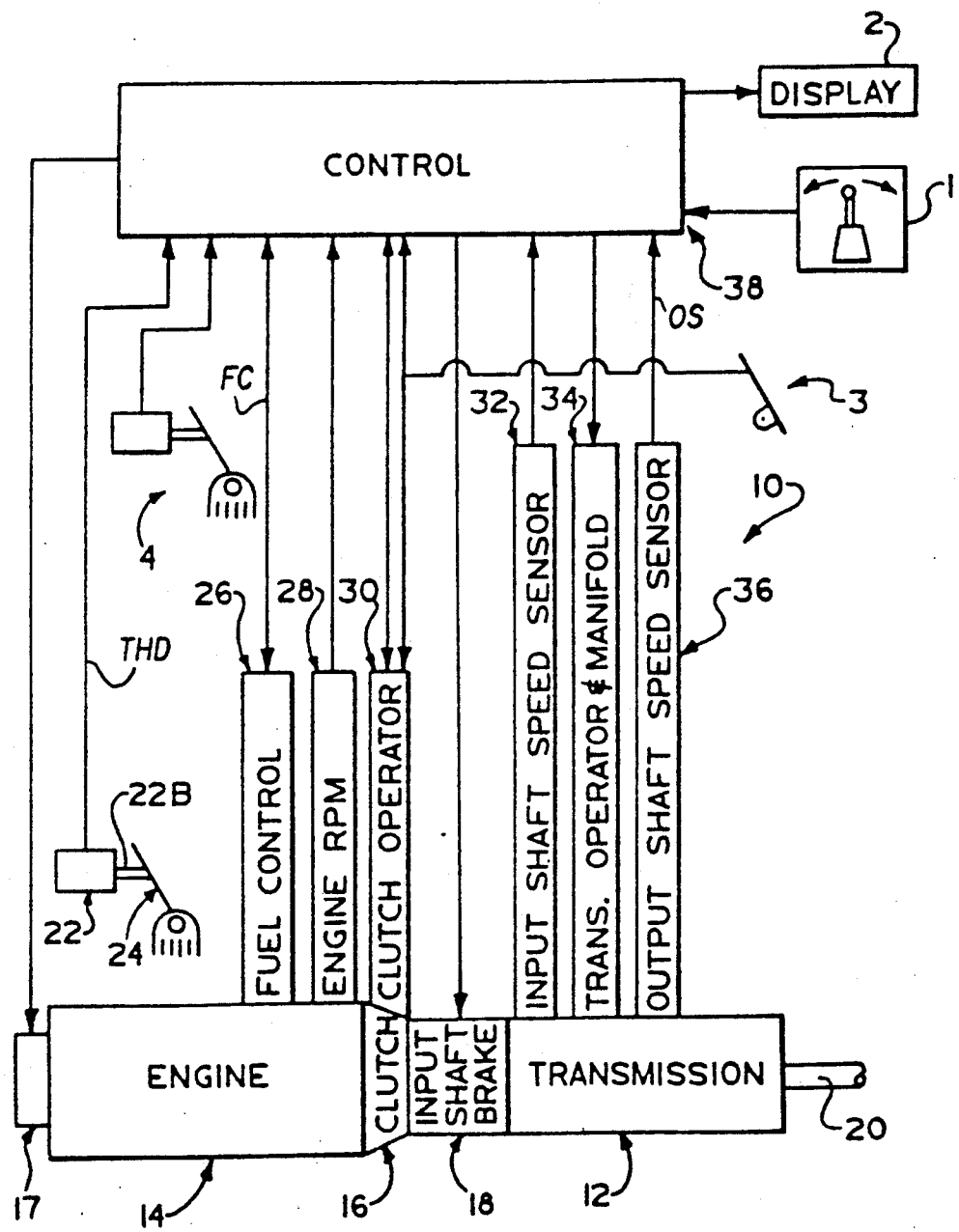
FIG. 1 is a symbolic illustration of an automatic/semi-automatic mechanical transmission system.

In the present description of the preferred embodiment, certain terminology will be used for descriptive purposes only and is not intended to be limiting. The terms "upward", "downward", "rightward" and "leftward" will refer to directions in the drawings to which reference is made. The terms "inward" and "outward", refer to directions towards and away from, respectively, the geometric center of the device, or portion thereof, being described. The above applies to derivatives of the terms above specifically mentioned, and terms of similar import.

The term "compound transmission" is used to designate a change speed transmission having a main transmission portion and an auxiliary transmission portion connected in series whereby the selected gear reduction in the main transmission portion may be compounded by further selected gear reduction in the auxiliary transmission portion. The term "splitter type compound transmission" as used herein will designate a compound transmission wherein the auxiliary transmission is used to provide various selectable steps for subdivisions of the gear ratio selected in the main transmission portion. In a splitter type compound transmission, the main transmission section is typically provided with relatively wide steps which are split or subdivided by the auxiliary section. The term "upshift" as used herein, shall mean the shifting from a lower speed gear ratio into a higher speed gear ratio.

The term "blocked transmission" or "blocked transmission section" shall designate a change gear constant mesh transmission or transmission section, wherein a selected one of a plurality of axially moveable gears is nonrotatably coupled to a shaft as a result of axial movement of the selected gear from the neutral to the engaged position thereof, and by means of a resiliently biased positive clutch and a blocker is utilized to prevent such engagement until the members of the positive clutch are at substantially synchronous rotation, such synchronous condition achieved by manual and/or automatic manipulation of the transmission input and/or output shafts to cause a crossing of synchronous condition therebetween, but not typically achieved by frictional contact of the selected clutch members sufficient to cause one of the clutch members, and the apparatus associated therewith, to rotate with the other clutch member. Blocked transmissions and/or transmission sections are illustrated in U.S. Pat. Nos. 3,799,002; 3,924,484; 4,192,196 and 4,440,037, and European Patent No. 0,070,353, the disclosures of all of which are hereby incorporated by reference.

The automatic or the semi-automatic control system of the present invention is particularly advantageously applied to a splitter type compound transmission of the type having a non-synchronized, non-blocked main transmission section connected in series with an auxiliary section of the blocked splitter type. Such transmissions are known in the prior art and are referred to as "semi-blocked" transmissions, and are described and illustrated in U.S. Pat. Nos. 4,735,109; 4,736,643 and European Patent No. 0070353, first published Feb. 9, 1983 (EP-A-0071353) and European Patent Application No. 83307061.8, published Sept. 5, 1984 (EP-A-0117342), the disclosures of which publications are hereby incorporated by reference.

The semi-automatic transmission system to which the present invention is particularly advantageously related, is described and illustrated in European Patent application 85305072.2, published Feb. 5, 1986 (EP-A-0 170 465), and above-mentioned U.S. Pat. No. 4,648,290, the disclosures of which publication is hereby incorporated by reference.

Referring to FIG. 1, the position of a driver-operated throttle 24 is sensed at sensor 22 and a signal indicative thereof (THD) fed to a central processing unit 38, which also receives inputs relative to engine speed from sensor 28 and/or transmission input shaft speed from sensor 32, transmission output shaft speed from sensor 36, and positive or negative actuations of the driver's gear shift lever, or "joy stick" 1, to be described in greater detail below. It is understood that engine speed is an indication of transmission input shaft speed, and visa versa, especially if clutch 16 is nonslippingly engaged, while transmission output shaft speed is an indication of vehicle speed.

Devices, such as throttle position sensor assembly 22, for sensing the operators setting of a throttle pedal 24, or the like, and providing a signal proportional to, or at least indicative of, the monitored setting, and so called "remote fuel control" or "fly by wire" systems utilizing same, are known in the prior art and illustrated in the U.S. Pat. Nos. 4,250,845; 4,305,359; 4,319,658 and 4,461,254, the disclosures of which are hereby incorporated by reference.

For control of vehicle AMT systems 10, such as the systems illustrated in above-mentioned U.S. Pat. Nos. 4,551,802; 4,361,060 and 4,081,065, it is important to provide accurate input signals to central processing unit, or control, 38, indicative of the operator's positioning of the throttle. The setting is usually expressed as a percentage of wide-open or full throttle with the idle position being zero percent (0%) and full or maximum throttle being one hundred percent (100%). This is the parameter monitored by plunger 22B of sensor assembly 22 and provides what will be referred to as the "throttle demand potentiometer" or "THD" input signal to control 38. In the alternative, a single indication of engine fueling, such as engine torque, may be utilized.

Figure 2:
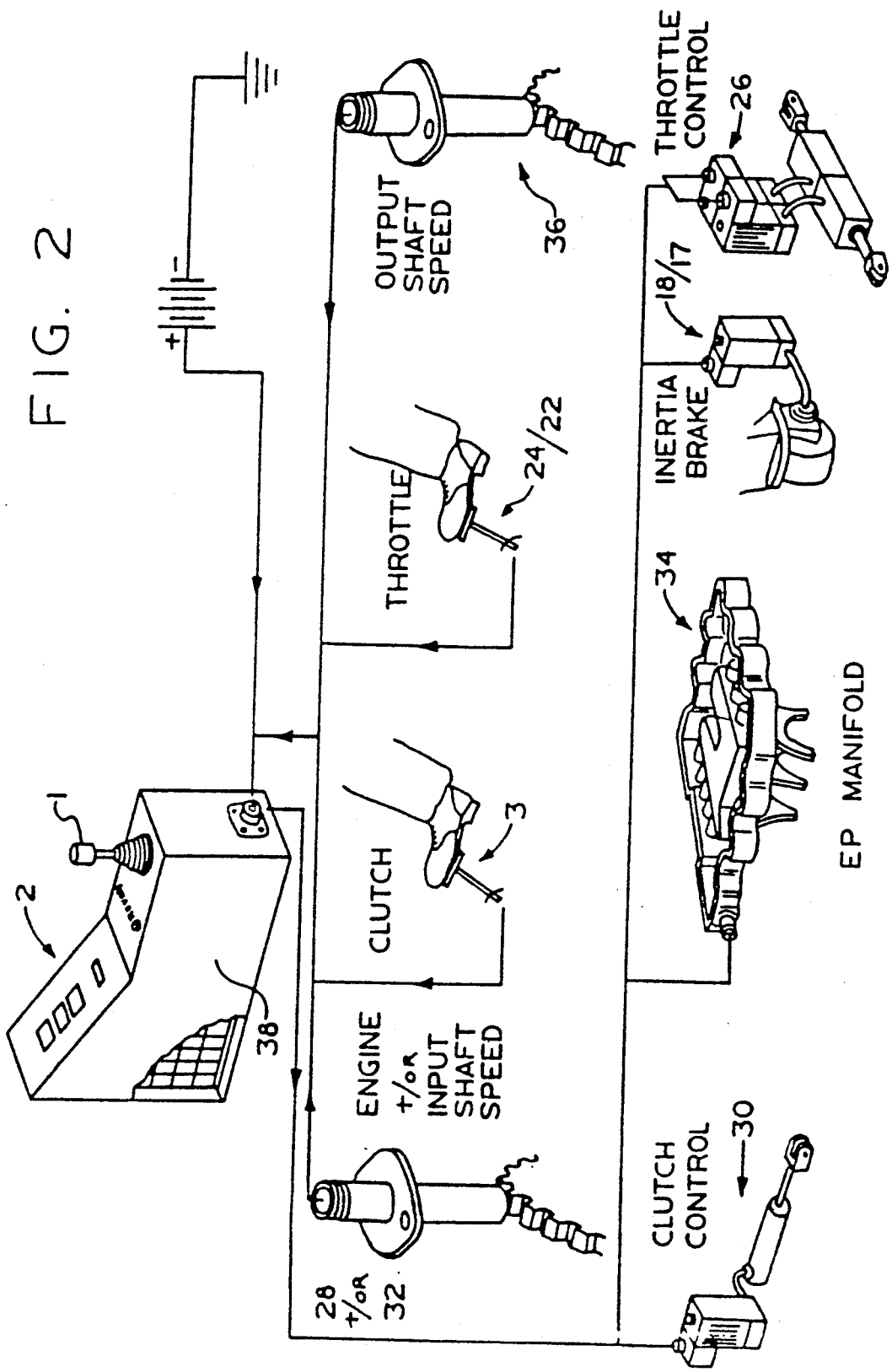
FIG. 2 is a symbolic illustration of control members and sensors of the system illustrated in FIG. 1.

Control logic circuits, sensors, and actuators for the transmission system 10 as disclosed in FIGS. 1 and 2, may be as disclosed in U.S. Pat. No. 4,361,060, the disclosure of which is hereby incorporated by reference. Specifically, central processing unit 38 receives inputs, processes same in accordance with predetermined logic rules, and provides command output signals to pneumatic and/or electrical actuators for control of an exhaust brake 17 and/or an input shaft brake 18 for rapid upshifts, and automatic fuel control 26 to "blip" the supply of fuel to the engine 14 to achieve rapid synchronous rotation preparatory to a downshift, clutch control via operator 30, and ratio shifting via transmission operator 34. The central processing unit also sends command output signals to the display 2 to be described in greater detail below. The automatic/semi-automatic transmission system 10 additionally comprises a usual foot operated manual clutch control 3 intended for use only for start from rest and/or low speed creeping maneuvering situations. The control 38 receives signals indicative of manual clutch control 3 position and of actuation of the vehicle brakes 4. The automatic/semi-automatic mechanical transmission system 10 also includes sources of electric and/or pneumatic power (not illustrated).

As used herein, the term "blip" designates a temporary increase in the supply of fuel to the engine 14, while the term "dip" means a momentary decrease in supply of fuel to the engine. The terms blip and dip are usually associated with automatic controller 38 commanded increases and decreases, respectively, of the supply of fuel to the engine independent of the operator selected position of manual throttle pedal 24.

Preferably, as may be seen by reference to FIG. 3, the central processing unit 38 may be contained in a box or housing 38A, which housing carries the display panel 2 having an upshift indicator display 2', a downshift indicator display 2'', and a currently engaged gear ratio display 2''', the shift select lever 1, an optional reverse enable button 1A, as well as a central processing unit electronic circuitry 38B.

The schematics of the control system of the semi-automatic mechanical transmission system 10 are also illustrated in FIG. 2.

Referring to FIG. 3B, the display 2 includes upshift indicator section 2', downshift indicator section 2'' and currently engaged gear ratio indicator section 2'''. As illustrated, the currently engaged gear ratio display section 2''' is presently displaying a "6" indicating that the vehicle transmission is operating in sixth (6th) gear. The upshift display section 2' has three lines indicating the maximum number of permissible consecutive upshifts permitted according to the sensed input parameters, such as sensed engine or input shaft speed and sensed output shaft speed as processed according to the predetermined logic rules or program. In the present situation, the three lines indicate that a single, a double or a triple upshift is permissible. Accordingly, the driver may select a permissible shift directly to either seventh (7th), eighth (8th) or ninth (9th) speed. The downshift display 2', section has two lines indicating the maximum number of permissible consecutive downshifts permitted according to the sensed parameters as processed by the predetermined logic or program. In the present situation, the two lines in display 2' indicate that the transmission may be permissibly downshifted to either fifth (5th) or to fourth (4th) gear.

Briefly, the permissibility of a possible upshift or downshift is determined by comparing the expected engine speed at the completion of such an upshift or downshift, assuming a substantially constant vehicle speed and fully engaged master clutch, to a fixed range of maximum and minimum permissible engine speeds. The central processing unit 38 will not issue command signals to execute a selected impermissible ratio change. Preferably, a central processing unit will execute the closest permissible ratio change to that selected by the operator. By way of example, assuming the conditions indicated by display 2 as illustrated in FIG. 3B, should the operator select a downshift to third gear, such a downshift will not be executed by the central processing unit 38 as being impermissible. However, in the preferred embodiment, the central processing unit 38 will issue command output signals for a double downshift from sixth gear to fourth gear. Not only is an impermissible ratio change refused, but the driver will usually have been advised already by display 2 that the ratio should never have been attempted or selected.

The display 2 provides an indication to the operator what upshifts and downshifts are permitable and as to which upshifts and downshifts are impermissible. Should the driver not heed the warning, the central processing unit 38 will not generate impermissible shift command even though synchronization of the mechanical jaw clutch elements could be obtained by the system.

When the upshift indication display 2' is blank, no upshift is allowed and the driver is probably driving at a very low economical engine RPM. Conversely, when the downshift indicator 2' is blank, i.e. has no horizontal lines displayed therein, no downshift is allowable, and maximum torque, acceleration or hill climbing will probably already be available in the system in its current engaged gear ratio. Gear shifts are always achieved without the operator manually engaging and/or disengaging the master clutch 16 by means of the mechanical manual clutch pedal 3, which is normally only used for starting from rest, reversing or for maneuvering in warehouses, etc., as vehicle clutches have traditionally been used.

To shift transmission 12, the driver moves lever 1 forward (for upshifts) and rearward (for downshifts) from the position illustrated in FIGS. 2 and 3. To select a single upshift, i.e. a shift to seventh gear, the operator will move lever 1 forward once and the lever will then return to the neutral or centered position under bias. If, in sixth gear as shown, the operator moves the lever forward three times in quick succession, each allowing its return to rest, he will skip two gears in effect, and achieve a skip shift directly into ninth speed (i.e. seventh and eighth speeds will not be engaged) almost instantaneously. Accordingly, multiple or skip shifts may be commanded by use of the semi-automatic control of the present invention. The declutching of the master clutch 16 and synchronizing of the selected jaw clutch members associated with the selected gear ratio is achieved automatically and rapidly due to automatic throttle and clutch control and braking of the input shaft and/or the engine. The control system is semi-automatic and the driver must exercise his discretion as to when to up or downshift, and as to how many gear ratios to up or downshift, but is not called upon to coordinate gear lever, throttle pedal and clutch actuation. Once the driver has selected a permitted gear ratio, the throttle is blipped to achieve necessary synchronization during a downshift, or dipped for achieving necessary synchronization during an upshift, all of which is done automatically for the driver by the central processing unit 38. The reverse mode of operation may be achieved only from the neutral at rest position and then is achieved by moving control lever 1 backwardly from the currently engaged neutral position. To prevent and inadvertent "downshift" into reverse, a reverse button 1A may be provided which button must be depressed prior to the central processing unit interpreting a backward movement of the control lever 1 when in the neutral position as a request for reverse operation.

Although the present invention has been described in terms of a semi-automatic mechanical transmission system, it is equally applicable to fully automated transmission systems.

The functions and components for the semi-automatic transmission are, gear ratio change selection switch or lever 1, display panel 2, control box 38, speed sensors 32, 36, engine (fuel) control 26, throttle and clutch sensors 22, 3 (detecting the driver's depression of them), electro-pneumatic control of shifts, clutch and brakes (using the engine manifold vacuum, together with a vacuum servo-follower if required), the input brakes 17 and/or 18 and their actuators, control cables, and the clutch actuator 30.

Referring to the items 1, 2 and central control unit 38, these input the driver's change requirements, tell him what gear he is in, which other ratios he can choose at any moment, including from rest, from sensed engine and vehicle status necessary to complete any gear shifts, either single or skip. Shifting is accomplished by the single or plural movement of the gear level 1, either forwards for up shifts or backwards for down shifts. The gear shift lever is spring biased to return to the rest or vertical position and one movement of the lever will instigate one shift control.

Control of the engine is by fuel control 26 which includes two (2) solenoid valves, one associated with the engine "dipping" and the other with engine "blipping". Dipping is used not only for up changes, but also preparatory to down changes to break the torque line. A back-to-back double pneumatic piston, which is slaved to the solenoid valves, provides servo pump manipulations, if desired without driver feel. These units respond to signals from the electronic panel. A "fly-by-wire" throttle control or full electronic engine management can be accommodated by the system.

In order for the system to function correctly it is necessary to identify the existence of full clutch and part-throttle actuations, this will be achieved by the placement of switches (micro or proximity) at least at the full extends of the clutch and initial accelerator movements from the driver's foot pedals.

The transmission operator 34 includes an electro pneumatic ("EP") manifold is preferably broken down into two elements. The first associated with the front box and the second with back box operations. The EP manifold is a manifold controlled by solenoid valves and associated with the cylinders carrying the shift pistons.

Preferably, transmission 12 is a multi-speed transmission having at least five, preferably nine or more, selectable forward ratios. The structure of a twelve forward speed splitter type transmission 12, and of the blocked jaw clutch members utilized in the auxiliary transmission section of transmission 12, is known in the prior art and may be appreciated in greater detail by reference to above mentioned U.S. Pat. Nos. 3,799,002; 3,921,469; 3,924,848; 4,194,410; 4,440,037; 4,736,643; 4,735,109 and to published European Patent Applications EP-A-0071353 and EP-A-0117342.

The transmission includes an input shaft 218 supported adjacent its rearward end by a bearing 220 and is provided with an input gear 222 nonrotatably connected thereto, as by splines. The input gear 222 simultaneously drives a plurality of main section countershafts at equal speeds. In the illustrated embodiment, the transmission is provided with two main section countershafts, 224 and 226, disposed on diametrically opposite sides of the mainshaft 228, which mainshaft is coaxially aligned with the input shaft 218 and is provided with a pilot portion 230 on its forward end rotatably received within and supported by the rearward end of the input shaft 218.

The input shaft 218 is normally driven in one direction only by a primemover, such as a throttle controlled Diesel engine E through a selectively operated, normally engaged, friction master clutch C. Clutch C may be selectively disengaged by use of pedal P as is known in the prior art. Clutch C may have a known clutch-brake associated therewith.

Each of the main section countershafts 224 and 226 is provided with an identical grouping of countershaft gears, such as the pair of gears 236, of identical size and number of teeth and disposed on diametrically opposite sides of the mainshaft 228. As may be seen by reference to FIG. 2, countershaft gears 242 and 244 may be defined by involute splines formed directly on the main section countershafts.

A plurality of main section mainshaft drive gears 246, 248, 250 and 252 surround the mainshaft 228 and are selectably clutchable thereto, one at a time, by sliding clutch collars as is well known in the art.

The main section mainshaft gears 246, 248 and 250 encircle the mainshaft 228, are in continuous meshing engagement with, and are floatingly supported by the diametrically opposite pairs of countershaft gears, 238, 240 and 242, respectively, which mounting means and the special advantages resulting therefrom are explained in greater detail in U.S. Pat. Nos. 3,105,395 and 3,335,616, the disclosures of which are hereby incorporated by reference. The mainshaft gear 252 is the reverse gear and is in continuous meshing engagement with a pair of countershaft gears 244 by means of conventional intermediate idler gears (not shown). The forwardmost countershaft gears 236 are continually meshed with and driven by the input gear 222 for causing simultaneous rotation of the countershafts 224 and 226 whenever the input shaft is rotatably driven.

Main section mainshaft gears 246, 248, 250 and 252; and main section countershaft gears 236, 238, 240, 242 and 244, and the idler gears, are all constantly meshed with and driven by the input gear 222 and thus, in combination, form the input gearing of the transmission 12.

As may be seen, various abutment rings 254 are provided to axially fix the main section mainshaft gears relative to mainshaft 228.

Sliding clutch collars 256, 258 and 260 are splined to mainshaft 228 for axial movement relative thereto and rotation therewith as is well known in the art.

Sliding clutch 256 is axially slidable by means of shift fork 262 to clutch gear 252 to the mainshaft. Sliding clutch 258 is axially slidable by means of shift fork 264 to clutch either gear 250 or 248 to the mainshaft. Sliding clutch 260 is axially slidable by means of shift fork 264 to clutch gear 246 to the mainshaft or to clutch the input gear 222 (and thus the input shaft 218) to the mainshaft. Shift forks 262, 264 and 266 are attached to shift bars or rails of a known shift bar housing assembly.

Considering now the splitter auxiliary section 214, the mainshaft 228 extends thereinto and is coaxially arranged with and piloted into an output shaft 274 which is in turn supported within the housing 216 by suitable bearings generally indicated at 276. Said auxiliary section further includes a plurality of auxiliary section countershafts 278 and 280 each having an identical grouping of countershaft gears 284, 286 and 288 therein.

As is known in the art and is illustrated in above-mentioned U.S. Pat. No. 3,105,395, to minimize the axial and transverse dimensions of a twin countershaft type compound transmission, the mainshaft section countershafts, 224 and 226, are displaced about 90° from the auxiliary section countershafts. Main section countershafts are supported in housing 216 by bearings 290 and 292 while auxiliary section countershafts, 278 and 280, are supported in housing 216 by bearings 294 and 296.

Two auxiliary section mainshaft gears, 308 and 310, encircle the mainshaft 228 and are constantly meshed with and floatingly supported by the auxiliary countershaft gear pairs 284 and 286, respectively. Output gear 312 is splined to output shaft 274 for axial movement relative thereto and rotational movement therewith. Output gear 312 is constantly meshed with auxiliary countershaft gear pair 288.

Resiliently biased clutch members 316, 318 and 320 are splined to mainshaft 228 and, in combination with blockers (not shown) provide resilient, blocked clutching apparatus of the type described in above-mentioned U.S. Pat. Nos. 3,799,002, 3,921,469 and 3,924,484 for selectively clutching gears 308, 310 and 312, respectively, one at a time, to mainshaft 228. Clutch 316 is biased axially by spring 330 and limited in its axial movement by positive stop 334. Clutch members 318 and 320 are biased axially apart by spring 138 surrounding the mainshaft and limited in axial movement by stops 338 and 340.

Gear 312 is axially moved by shift fork 342 and gears 308 and 310 are joined for joint axial movement and independent rotation by ring 346 and are axially movable by shift fork 348. Gears 308, 310 or 312 are selectively engaged, one at a time, to mainshaft 228. Of course, engagement of gear 312 to the mainshaft 228 is effective to couple mainshaft 228 directly to the output shaft 274.

The details of the blocked, resiliently biased clutch-blocker assembly of the present invention may be seen by reference to FIGS. 4A-4D.

The yieldable blocked jaw clutch structures are arranged between the shiftable mainshaft gears and the auxiliary section and are provided with resilient means for urging engagement thereof as set forth in detail in the above-mentioned U.S. Pat. No. 3,799,002; 3,924,484 and 3,983,979. While clutch means utilizing relatively nondeformable blockers of the prior art are not identical with each other, they are generally similar and hence insofar as the present invention is concerned, it will be sufficient to described only one of them in detail with the understanding that same may be applied to the other clutch units without difficulty by anyone skilled in the art. Therefore, for this purpose, referring to the positive jaw clutch unit positioned between the mainshaft gear 308 and the mainshaft 228 in the auxiliary transmission section 214, said jaw clutch unit is generally designated 356 and includes an annular clutch collar or clutch member 316 encircling the mainshaft 228. The clutch collar 316 is provided with internal splines 358 which are disposed within corresponding external splines 360 provided on the mainshaft 228 for interconnecting the clutch collar 316 to the mainshaft 228 for rotation therebetween. However, the cooperating splines 358 and 360 permit the clutch collar 316 to freely slide axially relative to the shaft 228. Other means for mounting clutch collar 316 to mainshaft 228 allowing relative axial but not rotational motion therebetween may be utilized. A stop ring 334 is seated within a suitable groove formed on the external periphery of the shaft 228 and is disposed for contacting the clutch collar 316 and limiting the rightward axial movement thereof. The collar 316 is normally resiliently urged by means of a spring 330 into a butting engagement with the stop ring 334.

The clutch collar 316 is provided with external teeth 362 thereon which are adapted to meshingly engage the internal teeth 364 provided on the mainshaft gear 308. The internal teeth 364 form the other jaw clutch member of clutch assembly 356. The teeth 362 on the clutch collar 316 are tapered, as at 366 and in a similar manner the leading edge of the teeth 364 on the mainshaft gear 308 are similarly tapered at 368. The tapered conical surfaces each extend at an angle of preferably between 30° and 40° relative to the longitudinal axis of the mainshaft 228. The exact degree of taper, and the advantages, thereof, are explained in detail in U.S. Pat. No. 3,265,173. The other end of the spring 330 resiliently acts against a spring seat member 369 fixed to mainshaft 228.

A selected number, here three, of the teeth 362 are partially removed for permitting the presence of a blocking ring as hereinafter further described. Such partial removal leaves, however, an axially shortened or partially removed tooth 370 for cooperation with the blocking ring.

Referring now to the relatively nondeformable blockers; also called blocker rings, blocking rings and sensors; one thereof is indicated generally at 324, and comprises a ring encircling the clutch member 316 and has an appropriate number, here three pairs, of radially inward projections 372 and 374, which when properly positioned will mate with the external teeth above mentioned. The inward projections or teeth 384 and 376 are contoured at their sides to lie snugly against the adjacent ones of the teeth 362, are positioned to project into the spaces between a partially removed tooth 370 and the teeth 362 on each side thereof. Each pair of projections 372 and 374 are circumferentially of less dimension than the corresponding circumferential spaces defined by partially removing teeth 370 and thus blocker ring 324 may be rotated in either a limited clockwise or counterclockwise direction relative to clutch member 316 from the position seen in FIG. 4B in which the space between teeth 372 and 374 aligns with partially removed tooth 370. Contact of either blocker tooth 372 or 374 by a clutch tooth 362 will limit such relative rotation and cause blocker 324 to rotate with clutch member 316. The space between the inwardly projecting teeth 372 and 374 is, however, of a clearance distance wider than the corresponding circumferential dimension of the tooth 370 so that when properly aligned at synchronism (or more accurately, when the relative speeds of the clutch components cross synchronism) the teeth 372 and 374 will straddle the tooth 370 and the clutch member 320 can move axially through but not past blocker ring 324 to effect engagement with its corresponding gear.

As may be seen, the end faces of the blocker teeth 372 and 374 are tapered as at 376 and 378. The end face of partially removed tooth 270 is also preferably provided with tapers to ramps 380 and 382 complementary with the tapers or ramps 178 and 180 on the blocker ring blocking teeth 372 and 374. The angles 383 of the ramps 376, 378, 380 and 382 is selected such that the blocking teeth and the partially removed teeth will remain in proper blocked position when the main transmission section 212 is engaged but will tend, under a contacting force, if an auxiliary section shift has been selected, to cause the blocker and clutch to assume a nonblocking position (by causing relative rotational movement of the clutch 316, blocker 324 and/or mainshaft 228) if the main transmission section is disengaged, i.e. in neutral. A ramp angle 382 of about 15°-25°, preferably about 20°, relative to a plan P normal to the axis of rotation of the mainshaft 226 has proven highly satisfactory for most known semi-blocked transmission structures.

As is described in greater detail by reference to above-mentioned U.S. Pat. No. 3,924,484, the radially inner side of ring 324 may be provided with an inwardly directed groove 384 which receives an annual resilient ring 386 which is normally of slightly less internal diameter than the external diameter of the teeth 362 so that when the parts are in the assembled condition, ring 386 is distorted slightly outwardly thereby to exert a light but definite pressure against the external surface of said teeth 362. Inasmuch as the ring 386 fits loosely and only in light frictional contact with the walls of the groove 384, this effects a significant resistance to axial movement between the blocker ring 126 and the clutch ring 316 but only an insignificant resistance to relative rotative movement therebetween.

A suitable conical surface 388 projects radially outwardly from the blocker ring 324 and is positioned for engagement with a similar conical surface 390 on a radially inner wall of the gear 308. The axial drag above mentioned is sufficient that the rotative driving effect of the surface 390 onto the blocker 324 is much greater than whatever rotative resistance may exist between the blocker 324 and the clutch member 314. A stop ring 392 limits movement of the blocker 324 away front the conical surface 390 when the clutch ring 316 moves out of engagement (leftwardly in FIG. 4A).

As may be seen to engage a selected auxiliary section 214 ratio, the ratio must be preselected and then the associated sensor must be moved to a nonblocking position. This is accomplished in one of two ways; either the rotational speed of the mainshaft 228 is manipulated to cause a reversal of the relative rotation of the clutch members (i.e., a crossing of synchronous) or the mainsection is shifted into neutral, lowering the inertia on the mainshaft 228 which allows the sensor unblocking ramps, 376 and 378, to rotate the mainshaft to a nonblocking position.

The latter method, described in detail in above-mentioned U.S. Pat. No. Re. 32,591, is very satisfactory for most situations. However, under certain conditions, the frictional and/or viscous drag forces, especially in relatively cold weather start up conditions, may cause the sensor unblocking ramps to operate somewhat slowly and/or somewhat unreliably.

Accordingly, to provide a more rapid and more positive shifting of the auxiliary section during upshifting, a control method has been devised which will assure a slight reversal of relative rotation of the preselected auxiliary section jaw clutch members if the clutch has not previously engaged, which reversal will cause the blocked jaw clutch to unblock and engage as the clutch members pass through synchronous, but will not cause unduly harsh shifting in the main transmission section if the auxiliary section has engaged.

Figure 5:
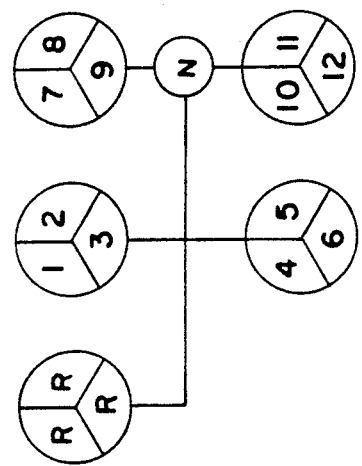
FIG. 5 illustrates the typical shift pattern for the transmission of FIG. 4.
Figure 4:
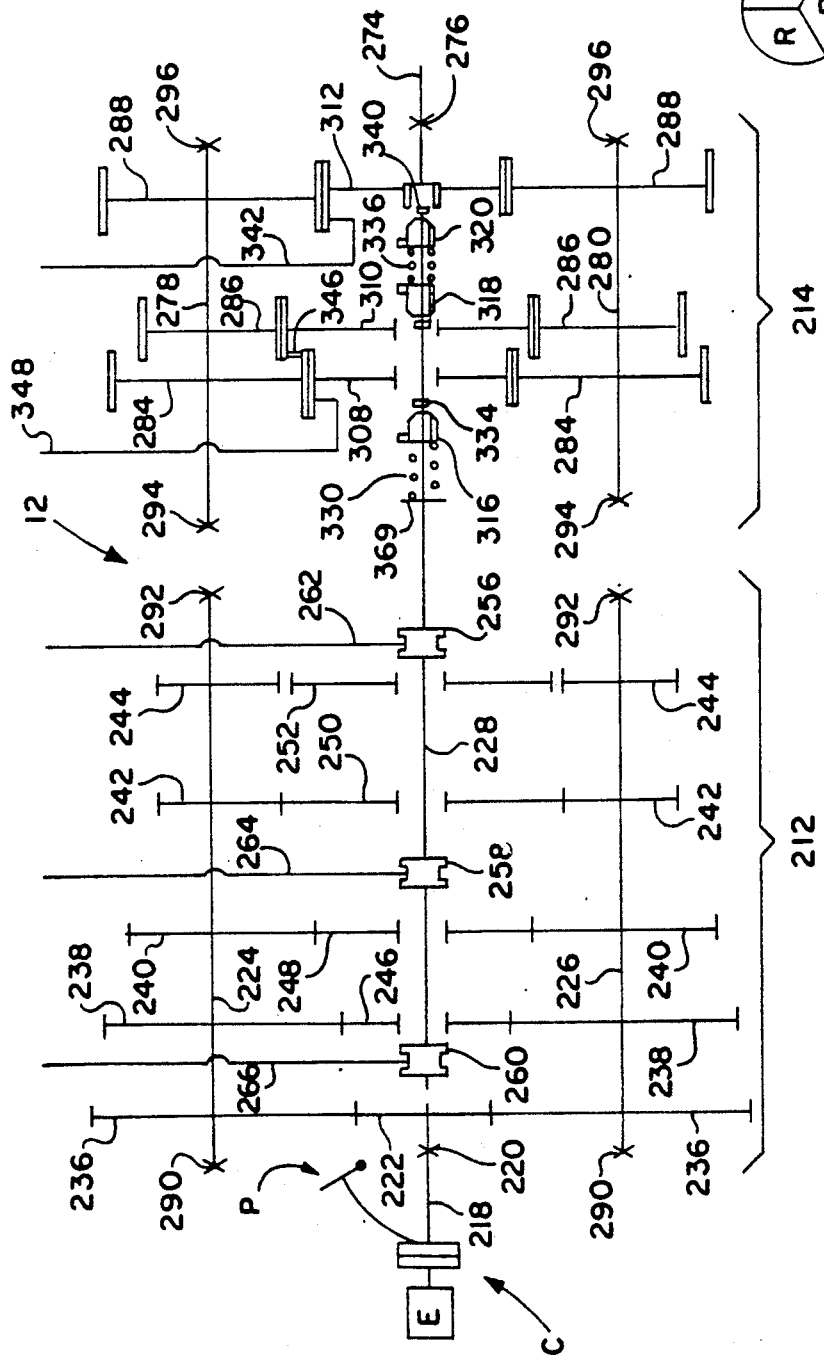
FIG. 4 is a symbolic illustration of a "4×3" twelve speed compound splitter type semi-blocked transmission.

There are two distinct types of single, i.e., nonskip, upshifts performed on a transmission of the type illustrated in FIGS. 4 and 5.

A simple upshift involves a gear change in only the auxiliary section. For example, an upshift from 5th to 6th speed involves only disengaging gear 310 from mainshaft 228 by disengaging clutch 318 and engaging mainshaft 228 to output shift 274 by engaging clutch 320. In both 5th and 6th speed, mainsection mainshaft gear 248 is drivingly engaged to mainshaft 228 by clutch collar 258.

In a compound upshift, both the main section 212 and the auxiliary section 214 of transmission 12 are shifted. For example, a shift from 6th to 7th speed involves an upshift in the main section from main section mainshaft gear 248 to main section mainshaft gear 246 while in the auxiliary section a downshift from direct drive with clutch collar 320 engaged to reduction with gear 308 engaged with the mainshaft by clutch collar 316.

Accordingly, in a single simple upshift, to cause a crossing of synchronous of the preselect auxiliary section jaw clutch, the mainshaft 228 must be slowed down to below a synchronous speed. In contrast, in a single compound upshift, to cause a crossing of synchronous of the preselected auxiliary section jaw clutch, the mainshaft 228 must be speeded up to above a synchronous speed. Achieving of a crossing of synchronous in the auxiliary section is accomplished by changing mainshaft speed as the output component of transmission 12, namely output shaft 274, output gear 312, auxiliary section countershafts 278 and 280, auxiliary section countershaft gears 284, 286, and 288, and splitter gears 308 and 310 are all driven by the vehicle momentum and may be considered as rotating at a substantially constant speed during an upshift.

As may be seen by reference to FIG. 1, the AMT system to be controlled includes an input shaft speed sensor 32 and an output Shaft speed sensor 36. Based upon a sensed output shaft speed ("OS") and a known gear ratio to be engaged ("GR"), a synchronous input shaft speed ("IS") can be calculated which is equal to $IS_s = OS_c * GR$.

For both simple and compound upshifts, the preliminary procedure is identical, namely condition the shift actuators to preselect the new auxiliary gear ratio to be engaged and to preselect neutral in the main transmission section. The driveline torque is then reduced to substantially zero torque transfer to allow the main section to shift to neutral and the auxiliary section to disengage the existing auxiliary gear ratio and move to preselect the desired section gear ratio. Reducing fuel and/or disengaging the master clutch are the methods utilized to reduce the driveline torque. Mainsection neutral is then confirmed by sensor/actuator 34.

At this point in time the transmission system is conditioned to upshift into the new ratio. As the main section is in neutral, the auxiliary section may already have engaged in the preselected ratio. However, to assure that the auxiliary section does engage and to eliminate the necessity of delaying to assure that the sensor unblocking ramps have a sufficient time to cause the blocked jaw clutches to unblock, the following procedure is followed.

The input shaft synchronous speed ($IS_s$) for current output shaft speed and intended gear ratio (GR) is calculated. As is known, for any upshift, assuming substantially constant vehicle speed, the input shaft speed is decreased in the new ratio compared to the old ratio. Accordingly, at time $T_1$, the input shaft brake is applied to cause a known, measured or calculated, deceleration 400 of input shaft speed. A period of time 402 from initiation to completion of a main section clutch engagement is also known, and corresponds to a known/estimated change in input shaft speed 404.

At engagement of the main section, the mainshaft will rotate at a speed equal to input shaft speed multiplied times the mainsection ratio. At input shaft synchronous speed $IS_s$, the mainshaft will rotate at a speed causing synchronous rotation of the preselected auxiliary section jaw clutch members.

Figure 6:
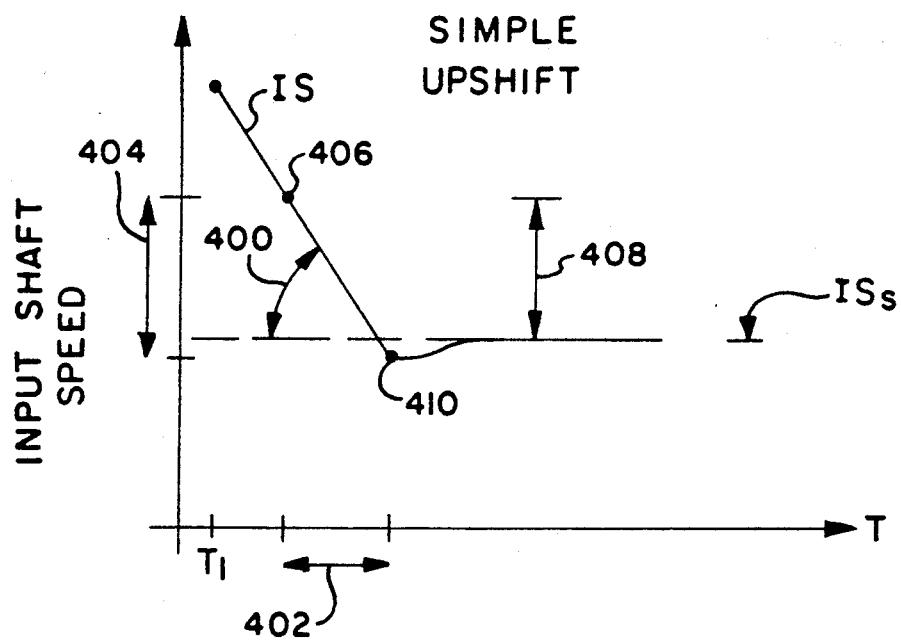
FIG. 6 is a graph of input shaft speed during a simple upshift performed according to the present invention.

Accordingly, in a simple upshift (see FIG. 6), reengagement of the main section into the previously engaged main section ratio is initiated at a point 406 at which input shaft speed IS is greater than synchronous input shift speed IS by an amount 408 slightly less than the expected input shaft speed decrease 404 during such clutch engagement. The main section will reengage at point 410, where input shaft speed is slightly less than synchronous input shaft speed IS$_s$, causing the mainshaft 228 to rotate at a speed causing a crossing of synchronous of the auxiliary section preselected jaw clutch members.

In a compound upshift of transmission 12, the auxiliary section is actually executing a relatively smaller ratio step downshift while the mainsection is executing a relatively larger ratio step upshift. Accordingly, to cause a crossing of synchronous in the preselected jaw clutch, the mainshaft speed must be increased to above the synchronous speed for the jaw clutch members.

Figure 7:
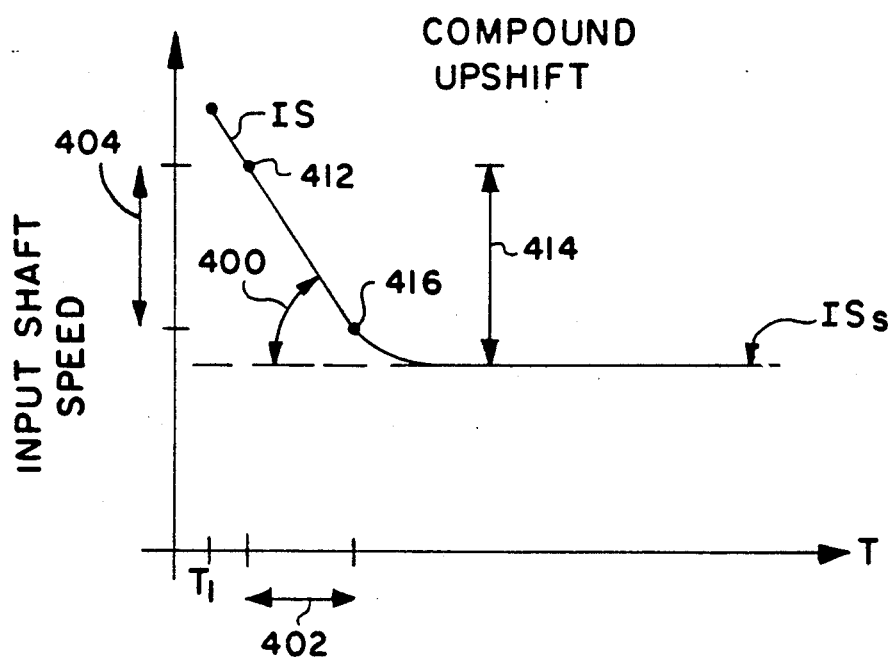
FIG. 7 is a graph of input shaft speed during a compound upshift performed according to the present invention.

In a compound upshift (see FIG. 7), engagement of he new mainsection ratio is initiated at a point 412 at which input shaft speed IS is greater than synchronous input shaft speed IS$_s$ by an amount 414 slightly greater than the expected decrease in input shaft speed (404) during such clutch engagement. The mainsection will engage at point 416 where input shaft speed is slightly greater than synchronous input shaft speed IS$_s$, causing the mainshaft 228 to rotate at a speed causing a crossing of synchronous of the auxiliary section preselected jaw clutch members.

The essence of the method is to assure mainsection engagement at an input shaft speed slightly less than IS$_s$ in a simple upshift and slightly greater than IS$_s$ in a compound upshift. The more accurate the control devices, the closer to IS$_s$ the mainsection can be engaged to provide the smoothest, least harsh shifting.

Although the preferred embodiment of the present invention has been described with a certain degree of particularity, various changes to form and detail may be made without departing from the spirit and scope of the invention as hereinafter claimed.

I claim:

1. A method of controlling upshifting of a vehicular automated mechanical change gear transmission system (10) comprising a manual fuel throttle control (24), a fuel throttle controlled engine (14), a multi-speed compound splitter type semi-blocked change gear mechanical transmission (12), a friction clutch (16) interposed the engine and transmission, a central processing unit (38) for receiving inputs indicative of transmission input shaft and output shaft rotational speeds lever and for processing same according to predetermined logic rules to determine a gear ratio of said transmission to be engaged and the synchronous speed of the input shaft in the gear ratio to be engaged (IS$_s$) under current operating conditions, and to issue command output signals to non-manually controlled operators including at least one of a fuel throttle control operator (26) and a clutch operator (30) and a transmission operator (34); said method characterized by:

(a) shifting the mainsection (212) of said transmission (12) to neutral;
    (b) shifting the blocked splitter type auxiliary section (214) of said transmission to a position of preselection of the auxiliary section ratio to be engaged; then
    (c) if the upshift is a simple upshift, causing the main section to be reengaged when the input shaft speed is less than the synchronous speed of the input shaft (IS$_s$); and
    (d) if the upshift is a compound upshift, causing the mainsection to be engaged in the new mainsection ratio when the input shaft speed is greater than the synchronous speed of the input shaft (IS$_s$).

2. The method of claim 1 including the steps of shifting of the transmission main section to neutral and the shifting of the blocked auxiliary section of the transmission to a position of preselection of the auxiliary section ratio to be engaged comprises at least one of (e) decreasing the amount of fuel supplied to the engine and (f) disengaging the friction clutch.

3. The method of claim 1 wherein said system (10) comprises an input shift brake (18), the steps of shifting of the transmission main section to neutral and the shifting of the blocked auxiliary section of the transmission to a position of preselection of the auxiliary section ratio to be engaged comprises (e) disengaging the friction clutch, and including the additional step of (f) after disengaging the friction clutch, activating the input shaft brake to retard the rotational speed of the input shaft.

4. The method of claim 3 wherein the central processing unit includes means to determine a reference value (404) indicative of an expected decrease in input shaft speed from initiation (406, 412) until completion (410, 416) of engaging the main transmission section, during simple upshifts said central processing unit commanding initiation of mainsection reengagement when the difference (408) between sensed input shaft speed (IS) and the synchronous speed of the input shaft (IS$_s$) is less than the reference value (404) and during compound upshifts said central processing unit commanding initiation of mainsection engagement when the difference (414) between sensed input shaft speed (IS) and the synchronous speed of the input shaft (IS$_s$) is greater than said reference value (404).

5. The method of claim 1 wherein the central processing unit includes means to determine a reference value (404) indicative of an expected decrease in input shaft speed from initiation (406, 412) until completion (410, 416) of engaging the main transmission section, during simple upshifts said central processing unit commanding initiation of mainsection reengagement when the difference (408) between sensed input shaft speed (IS) and the synchronous speed of the input shaft (IS$_s$) is less than the reference value (404) and during compound upshifts said central processing unit commanding initiation of mainsection engagement when the difference (414) between sensed input shaft speed (IS) and the synchronous speed of the input shaft (IS$_s$) is greater than said reference value (404).

6. A control system for controlling upshifting of a vehicular system (10) comprising a manual fuel throttle control multi-speed compound splitter type semi-blocked change gear mechanical transmission (12), a friction clutch (16) interposed the engine and transmission, a central processing unit (38) for receiving inputs indicative of transmission input shaft and output shaft rotational speeds lever and for processing same according to predetermined logic rules to determine a gear ratio of said transmission to be engaged and the synchronous speed of the input shaft in the gear ratio to be engaged (IS$_s$) under current operating conditions and to issue command output signals to non-manually controlled operators including at least one of a fuel throttle control operator (26) and a clutch operator (30) and a transmission operator (34); said control system characterized by:

(a) means for commanding shifting the mainsection (212) of said transmission (12) to neutral;

(b) means for commanding shifting the blocked splitter type auxiliary section (214) of said transmission to a position of preselection of the auxiliary section ratio to be engaged; then (c) if the upshift is a simple upshift, means for commanding the main section to be reengaged when the input shaft speed is less than the synchronous speed of the input shaft ($IS_s$); and (d) if the upshift is a compound upshift, means for commanding the mainsection to be engaged in the new mainsection ratio when the input shaft speed is greater than the synchronous speed of the input shaft ($IS_s$).

7. The control system of claim 6 wherein the shifting of the transmission mainsection to neutral and the shifting of the blocked auxiliary section of the transmission to a position of preselection of the auxiliary section ratio to be engaged comprises means for commanding at least one of (e) decreasing the amount of fuel supplied to the engine and (f) disengaging the friction clutch.

8. The control system of claim 6 wherein said system (10) comprises an input shaft brake (18), the means for commanding shifting of the transmission main section to neutral and the shifting of the blocked auxiliary section of the transmission to a position of preselection of the auxiliary section ratio to be engaged comprises means for commanding (e) disengaging the friction clutch, and including (f) after disengaging the friction clutch, means for commanding actuation of the input shaft brake to retard the rotational speed of the input shaft.

9. The control system of claim 8 wherein the central processing unit includes means to determine a reference value (404) indicative of an expected decrease in input shaft speed (404) from initiation (406, 412) until completion (410, 416) of engaging the main transmission section, during simple upshifts said central processing unit commanding initiation of mainsection reengagement when the difference (408) between sensed input shaft speed (IS) and the synchronous speed of the input shaft ($IS_s$) is less than the reference value (404) and during compound upshifts said central processing unit commanding initiation of mainsection engagement when the difference (414) between sensed input shaft speed (IS) and the synchronous speed of the input shaft ($IS_s$) is greater than said reference value (404).

10. The control system of claim 6 wherein the central processing unit includes means to determine a reference value (404) indicative of an expected decrease in input shaft speed (404) from initiation (406, 412) until completion (410, 416) of engaging the main transmission section, during simple upshifts said central processing unit commanding initiation of mainsection reengagement when the difference (408) between sensed input shaft speed (IS) and the synchronous speed of the input shaft ($IS_s$) is less than the reference value (404) and during compound upshifts said central processing unit commanding initiation of mainsection engagement when the difference (414) between sensed input shaft speed (IS) and the synchronous speed of the input shaft ($IS_s$) is greater than said reference value (404).

* * * * *